United States Patent
Ueda et al.

[11] Patent Number: 5,968,244
[45] Date of Patent: Oct. 19, 1999

[54] INK FOR INK-JET RECORDING

[75] Inventors: Takamasa Ueda, Ibaraki; Tomoko Yamamoto, Takarazuka; Masakazu Takahashi, Sanda, all of Japan

[73] Assignee: Minolta Co., Ltd., Osaka, Japan

[21] Appl. No.: 09/024,455

[22] Filed: Feb. 17, 1998

[30] Foreign Application Priority Data

Feb. 21, 1997 [JP] Japan ..................... 9-037327
Feb. 21, 1997 [JP] Japan ..................... 9-037328

[51] Int. Cl.⁶ .................................................. C09D 11/02
[52] U.S. Cl. ................................ 106/31.86; 106/31.9
[58] Field of Search ................... 106/31.75, 31.86, 106/31.9

[56] References Cited

U.S. PATENT DOCUMENTS

| | | | |
|---|---|---|---|
| 4,299,630 | 11/1981 | Hwang | 106/31.43 |
| 4,518,435 | 5/1985 | Stansfield et al. | 106/499 |
| 5,184,148 | 2/1993 | Suga et al. | 106/31.9 |
| 5,324,349 | 6/1994 | Sano et al. | 106/31.86 |
| 5,395,431 | 3/1995 | Siddiqui et al. | 106/31.59 |
| 5,397,386 | 3/1995 | Nakazawa et al. | 106/31.58 |
| 5,503,664 | 4/1996 | Sano et al. | 106/31.86 |
| 5,609,670 | 3/1997 | Okuda et al. | 106/31.26 |
| 5,609,671 | 3/1997 | Nagasawa | 106/31.9 |
| 5,776,232 | 7/1998 | Okuda et al. | 106/31.26 |
| 5,861,447 | 1/1999 | Nagasawa et al. | 106/472 |

*Primary Examiner*—Helene Klemanski
*Attorney, Agent, or Firm*—McDermott, Will & Emery

[57] ABSTRACT

The present invention relates to an ink for ink-jet recording containing carbon black particles having a specific surface active hydrogen content, water, and polyethyleneimine or alkylene oxide adduct of acetylene glycol.

11 Claims, No Drawings

INK FOR INK-JET RECORDING

RELATED APPLICATIONS

The present invention is based on Japanese Patent Applications Nos. 9-37,327 and 9-37,328, each content of which being incorporated by reference.

BACKGROUND OF THE INVENTION

1. Field of the Invention

The present invention relates to an aqueous pigment ink suitable for ink-jet recording methods.

2. Description of the Related Art

Among the various current recording methods, ink-jet recording methods are nearly noiseless during recording and are capable of recording at high speed, and are particularly noteworthy because recording is accomplished on plain paper without a special fixing process.

In general, aqueous dye inks comprising a water-soluble dye dissolved in an aqueous medium are used as ink-jet recording inks. When such aqueous dye inks are used in ink-jet recording, the recorded image is influenced by the physical properties of the aqueous dye ink and may disadvantageously show deterioration in respect to moisture resistance and light fastness. In the case of black inks in particular, a plurality of dyes are mixed for use as black ink because there are few water soluble dyes which have excellent black color reproducibility; however, a disadvantage arises insofar as black color tone changes when some dyes fade or discolor. This type of ink containing aqueous dye does not have high storage stability.

In recent years, aqueous inks using pigments such as carbon black and the like have been experimentally adapted to ink-jet recording methods in place of the aforesaid inks using dyes. Images formed by the ink including carbon black has excellent moisture resistance compared to that formed by the ink including water-soluble dyes because it is insoluble in water, and further provides excellent light fastness.

A disadvantage arises, however, insofar as the insolubility of carbon black in water, i.e., the ink medium, makes it difficult to assure the stability of carbon black finely dispersed in an aqueous medium. Further disadvantages arise when dispersion agent such as water-soluble resin or the like is added to improve the dispersion stability of the carbon black due unstable continuous discharge resulting from clogging of the discharge nozzle due to the viscosity of the medium.

In order to eliminate the aforesaid disadvantages, U.S. Pat. No. 5,609,671 discloses an ink having excellent dispersibility in water without adding dispersion agent such as water-soluble resin or the like by using a carbon black having a specific amount of surface active hydrogen.

A further disadvantage arises, however, in this aqueous ink containing a dispersion of carbon black provides inadequate glossiness of obtained images. This disadvantage produces a sense of unease in images as the black color fades when color images are reproduced with color inks. Further disadvantages arise such as the detachment of the carbon black from the surface of the print sheet when the image is immersed in water. This detachment is thought to be due to the low bonding strength of the carbon black to the print sheet compared to dyes, because the carbon black particles are simply bonded to the surface of the print sheet whereas dyes bond to the print sheet on the molecular level.

New disadvantages arise when the aforesaid aqueous ink containing a dispersion of carbon black is used for printing in an ink-jet printer, insofar as fluctuation environment temperature produces variation in the quality of the printed image.

SUMMARY OF THE INVENTION

An object of the present invention is to provide an ink for ink-jet recording which eliminates the previously described disadvantages and is capable of producing images having a high degree of blackness, and excellent light fastness and moisture resistance.

Another object of the present invention is to provide an ink for ink-jet recording which has excellent aqueous dispersibility of dispersion particles in the ink, and is capable of producing images having and excellent glossiness and fixing characteristics.

Yet another object of the present invention is to provide an ink for ink-jet recording which produces minimal variation in image quality due to environmental temperature fluctuation.

A first invention of the present application relates to an ink for ink-jet recording containing at least polyethyleneimine, carbon black particles having a surface active hydrogen content of 1.5 mmol/g or more, and water.

A second invention of the present application relates to an ink for ink-jet recording containing at least alkylene oxide adduct of acetylene glycol, carbon black particles having a surface active hydrogen content of 1.5 mmol/g or more, and water.

DESCRIPTION OF THE PREFERRED EMBODIMENTS

The aqueous ink of a first invention of the present application contains at least polyethyleneimine, carbon black microparticles, and water. According to the first invention of the present application, the high degree of blackness and moisture resistance of carbon black is maintained while improving dispersion stability in water, and glossiness and fixing characteristics of images without disadvantages such as clogging nozzles and the like.

The aqueous ink of a second invention of the present application contains at least alkylene oxide adduct of acetylene glycol, carbon black microparticles, and water. According to the second invention of the present application, the high degree of blackness and moisture resistance of carbon black is maintained while improving dispersion stability in water, and the environmental stability of the ink.

In the ink of the present invention, the carbon black used has a surface active hydrogen content of 1.5 mmol/g or more. The carbon black with the aforesaid surface active hydrogen content improved the affinity of the carbon black itself by having carboxyl groups or hydroxide groups containing active hydrogen in abundance on the surface, and is thought to produce excellent dispersibility in water by increasing the surface area and having chemical properties akin to water-soluble dyes. The carbon black surface active hydrogen content is desirably 1.5–5.0 mmol/g, and more desirably 2.0–5.0 mmol/g. When the surface active hydrogen content is less than the aforesaid range, there is inadequate dispersion stability of the carbon black particles in water, and when the content exceeds the aforesaid range, there is sufficient water dispersibility, but the production cost is undesirably high.

The carbon black surface active hydrogen content is measured using the Zeisel method described below. First, diethyl ether solution of diazomethane is titrated in the carbon black to completely exchange the active hydrogen on the surface of the carbon black with methyl group. Then, hydrogen iodide having a specific gravity of 1.7 is added to the carbon black and heated to vaporize the methyl group as methyl iodide. The methyl iodide vapor is trapped in silver nitrate solution, and precipitated as silver methyl iodide. The amount of methyl group, i.e., the amount of active hydrogen, is measured by the weight of the precipitate.

Using the aforesaid carbon black, the dispersion mean particle size of carbon black in the ink is adjusted to 20–200 nm, desirably 20–150 nm, and more desirably 30–100 nm. When the carbon black dispersion mean particle size is greater than 200 nm, the carbon black readily precipitates out of solution, thereby causing loss of stability of the ink over time.

The carbon black used in the present invention is desirably manufactured by oxidizing acidic carbon black using hypohalite salts. Carbon black manufactured in this way possesses excellent dispersion even without dispersion agent and is therefore unlikely to clog the ink discharge nozzle, while being capable of producing sharp images having a high degree of blackness.

Acidic carbon black has carboxyl groups on the surface of the carbon black particles, and desirably has a pH of 6 or less, and more desirably 4 or less. Acidic carbon black generally is manufactured by suitable oxidation of color carbon black, e.g., furnace black, by oxidation methods using an oxidant (e.g., nitric acid, ozone, hydrogen peroxide, nitrogen oxide and the like) or surface modifying methods such as plasma processing and the like.

Hypohalite salts are used to oxidize acidic carbon black. Specific examples of hypohalite salts include sodium hypochlorite and calcium hypochlorite, although sodium hypochlorite is particularly desirable from the perspective of reactivity. Oxidation of acid carbon black is generally accomplished by introducing, in a suitable amount of water, acidic carbon black and 10~30% hypo-halogen acid salt in an effective halogen concentration relative to the weight of carbon black, thoroughly mixing the solution for 5 hr or more, and preferably 10–15 hr, at a temperature of 50° C. or higher, and preferably 95–105° C. The obtained carbon black will have a surface active hydrogen content of 1.5 mmol/g or more.

Then, the product is filtered, and the byproduct salts are removed by washing in ion exchange water. Finally, the material is purified and concentrated using a separation membrane having a pore diameter of 0.01 μm or smaller, e.g., a reverse osmosis membrane, ultrafiltration membrane. The concentration is typically determined by the amount of carbon black content to obtain a concentrated pigment dispersion fluid of about 10–30% relative to water.

Carbon black having the aforesaid surface active hydrogen content of 1.5 mmol/g or more has excellent dispersibility in water, but images produced using a water-based ink utilizing said carbon black will have inadequate glossiness and fixing characteristics. Normally, glossiness and fixing characteristics are improved by adding a water-soluble resin as a carbon black dispersion agent; however, this solution adversely influences the effectiveness of using carbon black, particularly nozzle clogging characteristics.

The ink of a first invention of the present application improves the fixing characteristics of carbon black on the recording sheet surface by adding polyethyleneimine and carbon black particles in an aqueous medium. Polyethyleneimine has a low molecular weight relative to water-soluble resins, and improves nozzle clogging prevention as well as glossiness of the images produced using carbon black. Polyethyleneimine effectively improves the stability of the ink by mildew-proofing aqueous inks because it has chelating action and antibacterial action.

Although linear polymers represented by the chemical formula

-[CH$_2$CH$_2$NH]- may be used as the polyethyleneimine, materials having branches including primary, secondary, and tertiary nitrous amino. Commercial polyethyleneimine is typically a compound having branches of the ethyleneimine polymer. The molecular weight of suitable polyethyleneimine is 200~10,000, and preferably 250~2,000. The limitation of water solubility wen the molecular weight is within the aforesaid range can be used without regard to the degree of branching. Examples of polyethyleneimine usable in the present invention include Epomine (commercial name; Nippon Shokubai K. K.), SP series, other ethylene oxidation reacted polyethyleneimines, and derivatives such as such as alcohol and amine reacted polyethyleneimines.

The polyethyleneimine content is desirably 1~20 wt %, and more desirably 3~15 wt %, relative to the total weight of the ink. When the polyethyleneimine content is less than 1 wt %, the effectiveness of the present invention is not realized, whereas when said content exceeds 20 wt %, the viscosity becomes excessive so as undesirably to reduce resupply characteristics and airborne discharge reactivity of the ink, and reduce fixing speed.

Although carbon black having the aforesaid surface active hydrogen content of 1.5 mmol/g or more has excellent dispersibility in water, water-based inks using this carbon black are undesirably susceptible to variability in image quality caused particularly by temperature fluctuation. Specifically, under high temperature environmental conditions, the dot size becomes enlarged so as to cause a reduction in image quality, whereas printing becomes thin under low temperature conditions. In order to eliminate these disadvantages, the second invention of the present application adds alkylene oxide adduct of acetylene glycol to the aforesaid carbon black dispersion ink.

The alkylene oxide adduct of acetylene glycol is represented by the general chemical formula (A) below (A)

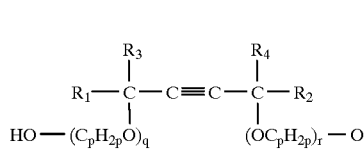

where R$_1$–R$_4$ represent respectively lower alkyl groups, p represents an integer of 2 or 3, and q and r represent respectively integers of 1 or more. Desirable compounds will have in chemical formula (A), R$_1$ and R$_2$ which are identical lower alkyl groups having 1–5 carbon atoms, and preferably lower alkyl groups of 2–4 carbon atoms, and more preferably isobutyl groups. Desirable compounds will have R$_3$ and R$_4$ which are identical lower alkyl groups of 1–5 carbon atoms, and preferably methyl groups. Examples of desirable alkylene oxides include ethylene oxide, propylene oxide, or random or block co-additives of both. The values q and r are integers of 1 or higher, such that q+r is 2–60, and desirably q+r is 2–30, and more desirably q+r is 6–20.

The alkylene oxide adduct of acetylene glycol of the formula (A) in which R$_1$ and R$_2$ are respectively isobutyl group, $R_3$ and $R_4$ are respectively methyl group and p is 2 available in the market as Olfine E1004 (q+r=3.5) (made by Nisshin Kagaku Kogyo K. K.), Olfine E1010 (q+r=10) (made by Nisshin Kagaku Kogyo K. K.) and Surfynol 485 (q+r=30) (made by Air Products K. K.), being useful for ink of the present invention.

The alkylene oxide adduct of acetylene glycol is contained in ink at amount of 0.01–5% by weight, preferably 0.1–5% by weight, more preferably 0.1–2% by weight.

The ink of the present invention may contain various well-known organic solvents and additives. It is desirable that the ink include water-soluble organic solvents to regulate moisture retention, surface tension, viscosity drying speed and the like. Examples of useful water-soluble organic solvents include alkyl alcohol having 1–4 carbon atoms such as ethanol, isopropanol, butanol and the like, alkylene glycols such as ethylene glycol, propylene glycol, diethylene glycol, triethylene glycol and the like, polyalkylene glycols such as polyethylene glycol, polypropylene glycol and the like, lower alkyl ethers of alkylene glycols such as ethylene glycol monoethyl ether, diethylene glycol monoethyl ether, triethylene glycol monobutyl ether and the like, pyrrolidones such as 2-pyrrolidone, N-methyl-2-pyrrolidone and the like, and glycerines. When such water-soluble organic solvents are included, it is desirable that their content is 1–30 wt % relative to the total weight of the ink.

Resin microparticles containing ionic groups may be added to the ink of the present invention. Such resin microparticles provide excellent dispersibility in aqueous media such as the ink medium, and do not cause disadvantages such as nozzle clogging, and further improve the wear resistance of the obtained images.

Examples of usable resin microparticles in the present invention include various resins such as polyester resin, vinyl polymers, polyurethane resins, styrene resins, styrene-acrylic copolymers and the like insofar as the surface of said resins include ionic groups. Examples of the aforesaid ionic groups include sulfonic acid group, carboxylic acid group, sulfuric acid group, phosphoric acid group, phosphonic acid group, and phosphinic acid group, or alkali metals salts thereof or ammonium salts thereof or primary, secondary, or tertiary amine groups; carboxylic acid-alkali metal salt group, carboxylic acid-ammonium salt group, sulfonic acid-alkali metal salt group, and sulfonic acid-ammonium salt group are desirable, and sulfonic acid-alkali metal salt group and sulfonic acid-ammonium salt group are particularly desirable from the standpoint of aqueous dispersion stability. Introduction of the aforesaid ionic groups may be accomplished by adding monomers having an ionic group when forming the resin microparticles.

It is desirable to use the aforesaid resin microparticles having a mean particle size of 0.01–1.0 $\mu$m, preferably 0.03–0.8 $\mu$m, and more preferably 0.05–0.6 $\mu$m. When the mean particle size is less than the aforesaid range, there is minimal effectiveness in improvement of friction resistance, whereas when the aforesaid range is exceeded, there is a tendency toward reduced aqueous dispersibility of the resin microparticles when stored long-term. The resin microparticles content is desirably 0.1–10 wt %, and more desirably 0.2–5 wt %, relative to the total weight of the ink. When the resin particle content exceeds the aforesaid range, nozzle clogging occurs and the degree of blackness of the obtained image is reduced, whereas when the content is less than the aforesaid range, there is inadequate effect gained from the addition.

The content of water-soluble high-molecular compound which improves fixing characteristics and imparts glossiness to the image may be a minimal amount so as to avoid nozzle clogging. Examples of useful water-soluble high molecular compounds include polyvinyl pyrrolidone, water-soluble acrylic resin, polyvinyl alcohol, polysaccharides and the like.

The ink may be adjusted to a pH of 8–10 to improve the storage stability of the ink. Adjustment of the pH may be accomplished using $NaHCO_3$, $Na_2B_4O_7$, alkanolamines such as ethanolamine, diethanolamine, and triethanolamine, and hydroxides of alkaline metals such as potassium hydroxide, lithium hydroxide and the like.

Suitable amounts of suitably selected additives such as well-known viscosity regulating agents, mildew-proofing agents, anti-corrosion agents, ultraviolet absorption agents, antioxidation agents, dispersion agents, dispersion stabilizing agents, surface active agents, metal ion sealing agent (chelate), and the like may be added to the aqueous pigment ink of the present invention.

Production Example 1 Carbon Black Dispersion Fluid

After 300 g of carbon black (MA-100, pH3.5, Mitsubishi Chemicals) was thoroughly mixed in 1,000 ml of water, 450 g of sodium hypochlorite (effective chlorine concentration: 12%) was titrated in and the solution was mixed for 10 hr at 100–105° C. The obtained slurry was filtered and washed. This pigment wet cake was redispersed in 3,000 ml water, and desalinated to an electrolytic value of 0.2 $\mu$s using a reverse osmosis membrane. Then, this pigment dispersion fluid was concentrated to a pigment concentration of 20 wt % to obtain carbon black dispersion fluid A.

The obtained carbon black dispersion fluid was acidified in hydrochloric acid solution, and again purified, concentrated, dried, and finely pulverized to obtain a carbon black powder. This carbon black powder had a surface active hydrogen content of 2.8 mmol/g.

Production Example 2 Carbon Black Dispersion Fluid

After 300 g of carbon black (MA-8, pH3.5, Mitsubishi Chemicals) was thoroughly mixed in 1,000 ml of water, 450 g of sodium hypochlorite (effective chlorine concentration: 12%) was titrated in and the solution was mixed for 8 hr at 100–105° C. The obtained slurry was filtered and washed. This pigment wet cake was redispersed in 3,000 ml water, and desalinated to an electrolytic value of 0.2 $\mu$s using a reverse osmosis membrane. Then, this pigment dispersion fluid was concentrated to a pigment concentration of 20 wt % to obtain carbon black dispersion fluid B.

The obtained carbon black dispersion fluid was processed in the same manner as example 1 to obtain a carbon black powder. This carbon black powder had a surface active hydrogen content of 2.5 mmol/g.

Production Example Resin Microparticle Dispersion Fluid

A mixture comprising 130 parts-by-weight (hereinafter abbreviated to "pbw") of dimethyl terephthalate, 56 pbw of dimethylisophthalate, 6 pbw of 5-sodium sulfoisophthalate-dimethyl ester, 159 pbw of ethyleneglycol, 30 pbw of tricyclodecane-dimethanol, and 0.1 pbw of tetrabutoxytitanate was introduced into an autoclave provided with a thermometer and mixer, and the material was subjected to ester exchange reaction by heating for 120 min at 180–230° C. The temperature of the reaction system was elevated to 240° C., and the system was subjected to a pressure of 1–10 mmHg to continue the reaction for 60 min to obtain a copolymer polyester resin. Then, 340 pbw of the obtained copolymer polyester resin 150 pbw of methylethylketone, and 140 pbw of tetrahydrofuran were dissolved at 80° C., after which 680 parts of water was added to obtain a copolymer polyester aqueous microdispersion having a mean particle size of about 0.15 µm. This aqueous microdispersion was then placed in a distillation flask and distilled until the distillate temperature attained 100° C., then cooled and water was added to a solid concentration of 10 wt % to obtain a resin microparticle dispersion fluid.

Example 1

Water was added to a mixture comprising 50 g of carbon black dispersion fluid A, 8 g of 2-pyrrolidone, 2 g of isopropylalcohol, and 9 g of polyethyleneimine having a molecular weight of 600 (Epomine SP-006; Nippon Shokubai K. K.) to a total weight of 100 g to obtain an aqueous pigment ink. The dispersion mean particle size of the carbon black in the ink was 150 nm. The dispersion mean particle size of the carbon black was measured using a laser diffusion-type particle distribution measuring device.

When images printed using this ink loaded in an ink-jet recording device (model MJ500C; Epson) were immersed in water, the pigment did not run, indicating excellent fixing characteristics. The images were subjected to visual evaluation and were deemed to have satisfactory degree of blackness and glossiness. Furthermore, ink discharge was stable, without solidification of the ink in the nozzle, and ink discharge remained excellent in print tests after several hours. There was no precipitate observed even after this ink was stored at 50° C. for 1 month, and ink discharge remained stable in subsequent print tests using this ink.

Example 2

Water was added to a mixture comprising 50 g of carbon black dispersion fluid A, 8 g of 2-pyrrolidone, and 6 g of polyethyleneimine having a molecular weight of 1,200 (Epomine SP-012; Nippon Shokubai K. K.) to a total weight of 100 g to obtain an aqueous pigment ink. The dispersion mean particle size of the carbon black in the ink was 150 nm.

Images were printed using this ink in the same manner as in Example 1, and when the printed images were immersed in water, the pigment did not run, indicating excellent fixing characteristics. The images were subjected to visual evaluation and were deemed to have satisfactory degree of blackness and glossiness. Furthermore, ink discharge was stable, without solidification of the ink in the nozzle, and ink discharge remained excellent in print tests after several hours. There was no precipitate observed even after this ink was stored at 50° C. for 1 month, and ink discharge remained stable in subsequent print tests using this ink.

Example 3

Water was added to a mixture comprising 50 g of carbon black dispersion fluid B, 8 g of 2-pyrrolidone, 2 g of isopropylalcohol, and 6 g of polyethyleneimine having a molecular weight of 600 (Epomine SP-006; Nippon Shokubai K. K.) to a total weight of 100 g to obtain an aqueous pigment ink. The dispersion mean particle size of the carbon black in the ink was 100 nm.

Images were printed using this ink in the same manner as in Example 1, and when the printed images were immersed in water, the pigment did not run, indicating excellent fixing characteristics. The images were subjected to visual evaluation and were deemed to have satisfactory degree of blackness and glossiness. Furthermore, ink discharge was stable, without solidification of the ink in the nozzle, and ink discharge remained excellent in print tests after several hours. There was no precipitate observed even after this ink was stored at 50° C. for 1 month, and ink discharge remained stable in subsequent print tests using this ink.

Example 4

Water was added to a mixture comprising 50 g of carbon black dispersion fluid A, 10 g of resin microparticle dispersion fluid, 8 g of 2-pyrrolidone, 2 g of isopropylalcohol, and 9 g of polyethyleneimine having a molecular weight of 600 (Epomine SP-006; Nippon Shokubai K. K.) to a total weight of 100 g to obtain an aqueous pigment ink. The dispersion mean particle size of the carbon black in the ink was 150 nm.

Images were printed using this ink in the same manner as in Example 1, and when the printed images were immersed in water, the pigment did not run, indicating excellent fixing characteristics. The images were subjected to visual evaluation and were deemed to have satisfactory degree of blackness and glossiness. Furthermore, ink discharge was stable, without solidification of the ink in the nozzle, and ink discharge remained excellent in print tests after several hours. There was no precipitate observed even after this ink was stored at 50° C. for 1 month, and ink discharge remained stable in subsequent print tests using this ink. Furthermore, the images were not disturbed even when vigorously rubbed with a finger, indicating excellent wear characteristics.

Comparative Example 1

Water was added to a mixture comprising 50 g of carbon black dispersion fluid A, 8 g of 2-pyrrolidone, and 2 g of isopropylalcohol to a total weight of 100 g to obtain an aqueous pigment ink.

Images were printed using this ink in the same manner as in Example 1, and when the printed images were immersed in water, the pigment ran, indicating poor fixing characteristics. The images were subjected to visual evaluation and were deemed to have satisfactory degree of blackness but unsatisfactory glossiness.

Comparative Example 2

Water was added to a mixture comprising 50 g of carbon black dispersion fluid B, 8 g of 2-pyrrolidone, and 2 g of isopropylalcohol to a total weight of 100 g to obtain an aqueous pigment ink.

Images were printed using this ink in the same manner as in Example 1, and when the printed images were immersed in water, the pigment ran, indicating poor fixing characteristics. The images were subjected to visual evaluation and were deemed to have satisfactory degree of blackness but unsatisfactory glossiness.

Comparative Example 3

Water was added to a mixture comprising 10 g of carbon black (MA100; surface active hydrogen content 0.13 mmol/g; Mitsubishi Chemicals), 8 g of 2-pyrrolidone, 2 g of isopropylalcohol, and 6 g of polyethyleneimine having a molecular weight of 600 (Epomine SP-006, Nippon Shokubai K. K.) to a total weight of 100 g to obtain an aqueous pigment ink. When the obtained ink was allowed to stand for more than 10 hr the carbon black precipitated out to create a supernatant, thus making the ink unsuitable for printing.

Example 5

Water was added to a mixture comprising 50 g of carbon black dispersion fluid A, 8 g of glycerin, 2 g of isopropylalcohol, and 0.1 g of ethylene oxide adduct of acetylene glycol (Olfine E1010; Nisshin Kagaku Kogyo K.K.) to a total weight of 100 g to obtain an aqueous pigment ink. The dispersion mean particle size of the carbon black in the ink was 150 nm. The dispersion mean particle size of the carbon black was measured using a laser diffusion-type particle size distribution measuring device.

Images were printed using this ink loaded in an ink-jet recording device (model MJ500C; Epson) at temperatures of 10° C., 25° C., and 35° C. Even at 35° C., there was no deterioration of image quality due to increased dot size compared to images printed at 25° C., and thin printing was not observed at 10° C. The images were subjected to visual evaluation and were deemed to have satisfactory degree of blackness. Furthermore, ink discharge was stable, without solidification of the ink in the nozzle, and ink discharge remained excellent in print tests after several hours. There was no precipitate observed even after this ink was stored at 50° C. for 1 month, and ink discharge remained stable in subsequent print tests using this ink.

Example 6

Water was added to a mixture comprising 50 g of carbon black dispersion fluid A, 8 g of glycerin, 2 g of isopropylalcohol, and 0.5 g of ethylene oxide adduct of acetylene glycol (Olfine E1004; Nisshin Kagaku Kogyo K.K.) to a total weight of 100 g to obtain an aqueous pigment ink. The dispersion mean particle size of the carbon black in the ink was 150 nm.

Images were printed using this ink under the same environmental conditions as in example 5. Even at 35° C., there was no deterioration of image quality due to increased dot size compared to images printed at 25° C., and thin printing was not observed at 10° C. The images were subjected to visual evaluation and were deemed to have satisfactory degree of blackness. Furthermore, ink discharge was stable, without solidification of the ink in the nozzle, and ink discharge remained excellent in print tests after several hours. There was no precipitate observed even after this ink was stored at 50° C. for 1 month, and ink discharge remained stable in subsequent print tests using this ink.

Example 7

Water was added to a mixture comprising 50 g of carbon black dispersion fluid B, 8 g of glycerin, 2 g of isopropylalcohol, and 0.8 g of ethylene oxide adduct of acetylene glycol (Olfine E1010; Nisshin Kagaku Kogyo K.K.) to a total weight of 100 g to obtain an aqueous pigment ink. The dispersion mean particle size of the carbon black in the ink was 100 nm.

Images were printed using this ink under the same environmental conditions as in Example 5. Even at 35° C., there was no deterioration of image quality due to increased dot size compared to images printed at 25° C., and thin printing was not observed at 10° C. The images were subjected to visual evaluation and were deemed to have satisfactory degree of blackness. Furthermore, ink discharge was stable, without solidification of the ink in the nozzle, and ink discharge remained excellent in print tests after several hours. There was no precipitate observed even after this ink was stored at 50° C. for 1 month, and ink discharge remained stable in subsequent print tests using this ink.

Example 8

Water was added to a mixture comprising 50 g of carbon black dispersion fluid A, 10 g of resin microparticle dispersion fluid, 8 g of glycerin, 2 g of isopropylalcohol, and 0.1 g of ethylene oxide adduct of acetylene glycol (Olfine E1010; Nisshin Kagaku Kogyo K.K.) to a total weight of 100 g to obtain an aqueous pigment ink. The dispersion mean particle size of the carbon black in the ink was 150 nm.

Images were printed using this ink under the same environmental conditions as in Example 5. Even at 35° C., there was no deterioration of image quality due to increased dot size compared to images printed at 25° C., and thin printing was not observed at 10° C. The images were subjected to visual evaluation and were deemed to have satisfactory degree of blackness. Furthermore, ink discharge was stable, without solidification of the ink in the nozzle, and ink discharge remained excellent in print tests after several hours. There was no precipitate observed even after this ink was stored at 50° C. for 1 month, and ink discharge remained stable in subsequent print tests using this ink. Furthermore, the images were not disturbed even when vigorously rubbed with a finger, indicating excellent wear characteristics.

Comparative Example 4

Water was added to a mixture comprising 50 g of carbon black dispersion fluid A, 8 g of glycerin, and 2 g of isopropylalcohol to a total weight of 100 g to obtain an aqueous pigment ink.

Images were printed using this ink under the same environmental conditions as in Example 5. At 35° C., image quality was adversely affected due to enlargement of dot size, and printing was thin at 10° C.

Comparative Example 5

Water was added to a mixture comprising 50 g of carbon black dispersion fluid B, 8 g of glycerin, and 2 g of isopropylalcohol to a total weight of 100 g to obtain an aqueous pigment ink.

Images were printed using this ink under the same environmental conditions as in Example 5. At 35° C., image quality was adversely affected due to enlargement of dot size, and printing was thin at 10° C.

Comparative Example 6

Water was added to a mixture comprising 50 g of carbon black dispersion fluid A, 8 g of glycerin, 2 g of isopropylalcohol, and 0.3 g of nonionic surface active agent (polyether-modified silicone oil TSF4452; Toshiba Silicone) to a total weight of 100 g to obtain an aqueous pigment ink.

Images were printed using this ink under the same environmental conditions as in Example 5. At 35° C., image quality was adversely affected due to enlargement of dot size, and printing was thin at 10° C.

Comparative Example 7

Water was added to a mixture comprising 10 g of carbon black (MA100, surface active hydrogen content 0.13 mmol/g, Mitsubishi Chemicals), 8 g of glycerin, 2 g of isopropylalcohol, and 0.1 g of ethylene oxide adduct of acetylene glycol (Olfine E1010; Nisshin Kagaku Kogyo K.K.) to a total weight of 100 g to obtain an aqueous pigment ink.

When the obtained ink was allowed to stand for more than 10 hr the carbon black precipitated out to create a supernatant, thus making the ink unsuitable for printing.

What is claimed is:

1. An ink for ink-jetting, comprising:
an alkylene oxide adduct of acetylene glycol;
a carbon black having a surface active hydrogen content of 1.5 mmol/g or more; and water.

2. The ink of claim 1, wherein the alkylene oxide adduct of acetylene glycol is represented by the formula (A):

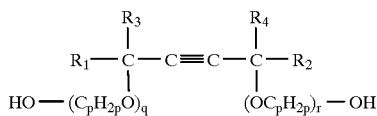

(A)

in which $R_1$–$R_4$ are respectively a lower alkyl group; p is an integer of 2 or 3: and q and r are respectively an integer of 1 or more.

3. The ink of claim 1, wherein the alkylene oxide adduct of acetylene glycol is contained at an amount of 0.01 to 5% by weight, based on total weight of the ink.

4. The ink of claim 2, wherein $R_1$ and $R_2$ are the same alkyl group having 1–5 carbon atoms, $R_3$ and $R_4$ are the same alkyl group having 1–5 carbon atoms, and q+r is within the range of 2–60.

5. The ink of claim 4, wherein $R_1$ and $R_2$ are the same alkyl group having 2–4 carbon atoms, $R_3$ and $R_4$ are respectively a methyl group, and q+r is within the range of 2–30.

6. The ink of claim 1, wherein the carbon black has a dispersion mean particle size of 20 to 200 nm in the ink.

7. The ink of claim 1, wherein the carbon black has the surface active hydrogen content of 1.5 to 5 mmol/g.

8. The ink of claim 1, which further comprises resin particles having an ionic group.

9. The ink of claim 8, wherein the resin particles having a mean particle size of 0.01 to 1 μm.

10. The ink of claim 8, wherein the resin particles are contained at an amount of 0.01 to 15% by weight, based on total weight of the ink.

11. The ink of claim 8, wherein the resin particles have the ionic group selected from the group consisting of carboxylic acid-alkali metal salt group, carboxylic acid-ammonium salt group, sulfonic acid-alkali metal salt group and sulfonic acid-ammonium salt group.

* * * * *